May 16, 1939.  N. GRUBELIC  2,158,795
AUTOMATIC WEIGHING MACHINE FOR DISPENSING AND MIXING PAINT
Filed Aug. 11, 1936  4 Sheets-Sheet 1

INVENTOR
*Nicholas Grubelic*
BY
*Harry Jacobsen*
ATTORNEY

May 16, 1939.  N. GRUBELIC  2,158,795
AUTOMATIC WEIGHING MACHINE FOR DISPENSING AND MIXING PAINT
Filed Aug. 11, 1936  4 Sheets-Sheet 2

INVENTOR
*Nicholas Grubelic*
BY
ATTORNEY

May 16, 1939. N. GRUBELIC 2,158,795
AUTOMATIC WEIGHING MACHINE FOR DISPENSING AND MIXING PAINT
Filed Aug. 11, 1936 4 Sheets-Sheet 3

INVENTOR
*Nicholas Grubelic*
BY
ATTORNEY

May 16, 1939.  N. GRUBELIC  2,158,795
AUTOMATIC WEIGHING MACHINE FOR DISPENSING AND MIXING PAINT
Filed Aug. 11, 1936  4 Sheets-Sheet 4

INVENTOR
Nicholas Grubelic
BY
ATTORNEY

Patented May 16, 1939

2,158,795

UNITED STATES PATENT OFFICE 2,158,795

AUTOMATIC WEIGHING MACHINE FOR DISPENSING AND MIXING PAINT

Nicholas Grubelic, Great Neck, N. Y.

Application August 11, 1936, Serial No. 95,355

17 Claims. (Cl. 249—14)

This invention relates to machines for dispensing automatically measured quantities of paints of different colors, to produce a total predetermined quantity of mixed paint of a desired color, preferably in accordance with a formula either based on a standard unit total quantity, or on any total quantity.

In my prior copending application for patent for Device for dispensing and mixing paint and the like, Serial No. 11,893, I have disclosed a machine having a similar function, but controlling the standard color paint components by volumetric measurements.

I have found, however, that a machine dispensing the component paints by weighing the amount dispensed, is much simpler in construction and more accurate in its operation, than one which controls the volume of the components. Other advantages of the weight controlling machine over a volume controlling machine will be obvious from what follows.

As has been pointed out in my said copending application, it is frequently desirable to obtain a small quantity, often as little as one ounce of a mixed matching paint for repair or redecorating purposes. This is particularly true in the automobile body repair industry, as when fenders and other body parts are to be repaired and repainted. In many cases very small quantities of paint are needed to complete the repair. But even these small quantities must match the remaining undamaged surfaces perfectly. Automobiles are now painted in many thousands of different colors. Formulae for these colors are issued by the automobile manufacturers, body manufacturers, or paint manufacturers. These formulae may be based on a unit quantity of one quart, or on a total of one hundred fluid ounces, or on an arbitrary total. If a total of more or less than the total of the formula is desired, the quantity of each component color must be computed by persons unskilled in such computations.

My invention therefore contemplates the provision of a machine which can be set to determine the total quantity desired of the final product which is a mixed paint, and which can also be set to determine the amount of a particular or standard color called for by a formula, and when so set, dispenses only the required proportional amount of the particular standard color which there should be in the desired total quantity of mixed paint, without the necessity for any calculations on the part of the user.

My invention further contemplates the provision of a simple but accurate machine which carries the required number of standard colors and which is adapted for the selection of any one of a number of required colors for dispensing purposes.

My invention further contemplates the provision of means for automatically dispensing the required proportional amount of any selected standard color required in a total predetermined quantity of mixed paint, in accordance with a formula for a total quantity of mixed paint, the dispensing of the particular standard color being automatically halted when the required amount has been dispensed.

My invention further contemplates the provision of a machine adapted to be set in advance to determine the total quantity of mixed paint and also to determine the amount of each standard color component of the mixed paint, and when so set, to automatically dispense the required amount of each component when the container for such component has been brought into the dispensing position thereof.

The various objects of my invention will be clear from the description which follows and from the drawings, in which.

In the practical embodiment of my invention which I have shown by way of example, the dispensing of the proper quantities of standard paints is controlled by a pivoted beam or lever, which lever controls the means for opening and closing the paint discharge valve of the selected container for standard paint. A series of standard paint containers 20 are rotatably supported in such a manner that any one of the containers may be selected for the purpose of dispensing paint therefrom.

Figure 3:
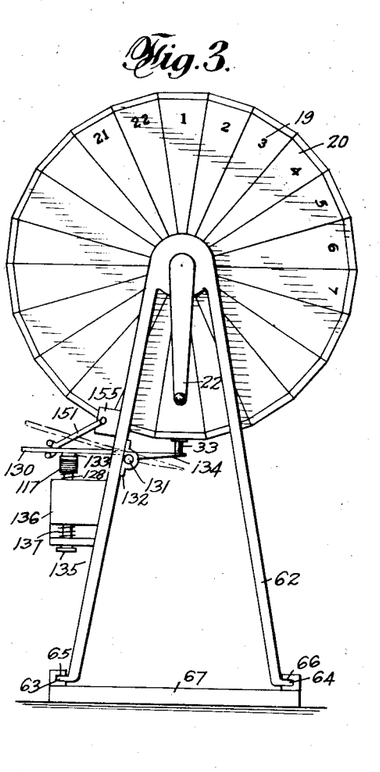
Fig. 3 is an end elevation thereof.

As shown in Fig. 3, there are twenty-two of such containers, each adapted to hold a paint of a basic or standard color. In practice, there are approximately twenty-two of such colors, whereby many thousands of combinations to produce a final mixed paint is possible. A suitable number 19 may be marked on each container and a table of numbers giving the color or shade may be supplied, so that reference to the table gives the color of the paint in each container. Each of the containers is preferably wedge shaped so that all of the containers may be arranged in approximately the form of a cylinder or polygonal prism, rotatable about the shaft 21. The containers may be suitably secured to each other as by riveting, welding or the like to hold them in place. To rotate any selected container into its proper dispensing position on the rotation of said shaft, a handle 22 is provided, said handle serving also to stir the paint in all the containers so that the standard colors are at all times ready to be dispensed. Each of the containers 20 is preferably made with an open end adapted to be closed by the valve mechanism provided for that purpose.

Figures 1, 7, 11:
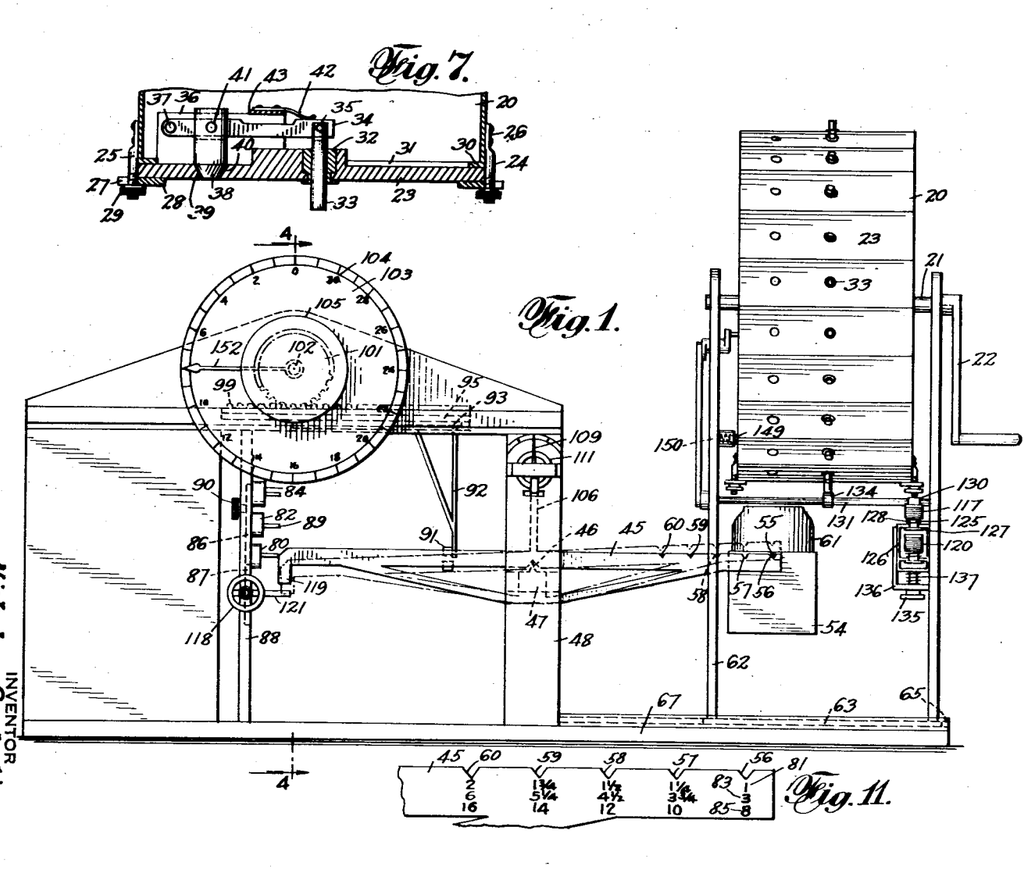
Fig. 1 is a front elevation of my new machine.
Fig. 7 is a vertical section of the outer end portion of one of the standard paint containers, and of the valve mechanism controlling the discharge of paint therefrom.
Fig. 11 is a front view of one end of the weighing lever showing typical scales of total quantities of paint thereon.

As shown in Fig. 7, the valve mechanism comprises the plate 23 of substantially the same size as the outer end of the container, said plate being adapted to close said outer open end, being secured thereto by suitable clamping means. Said means as shown, takes the form of a pair of screws 24, 25, each having a flattened inner portion as 26 suitably secured to a side face of the container as by welding or the like. Each of the screws passes through a suitable slot as 27 in the plate 23 or in an extension 28 of said plate and carries the nut 29 at its outer end. It will be seen that on the tightening of the nuts 29, the cover 23 is adequately secured to the container and forms a proper seal in connection with the inturned flange 30 surrounding the opening 31 of the container.

It will be understood that a suitable gasket may be interposed between the plate 23 and the flange 30, if desired. In the substantially central bearing 32 of the plate 23, there is slidably mounted the slidable pin 33, the inner end of which is pivotally connected to one end of the lever 34, as by means of the pivot pin 35. The other end of the lever 34 is pivoted between the pair of spaced uprights 36, extending inwardly from the plate 23, as by means of the pivot pin 37. Intermediate its ends, the lever 34 carries the valve plunger 38, which is suitably tapered at its outer end 39 to adequately seat on the correspondingly tapered valve seat surrounding the valve opening 40 in the plate 23. The lever 34 passes through a suitable longitudinal slot at the inner end of the valve plunger 38, and is secured to the plunger by the pin 41 passing through the lever and said plunger. A suitable spring 42 acts on the free end of the lever 34 to normally urge the pin 33 and the lever 34 downwardly as viewed in Fig. 7 and thereby to carry the valve plunger 38 into valve closing position. As shown, the spring 42 is mounted on a cross bar 43 arranged transversely of the uprights 36 and secured thereto.

It will be understood that when the pin 33 is raised by mechanism provided for that purpose, the valve is opened and paint is permitted to flow out of the container 20 through the valve opening 40 into a suitable receptacle provided for that purpose. It will also be understood that when the valve is closed, the flow of paint stops. Means, later to be described, are provided for raising the pin 33 and opening the valve at the proper time to discharge paint from the container, for permitting the spring 42 to lower the lever 34 and to close the valve after the required amount of paint has been dispensed from the container.

Means are also provided for controlling the valve operating means so that only the required amount of standard paint is dispensed from any one container. Said required amount bears the same ratio to the total quantity of mixed paint desired, as the quantity of said standard paint in the formula bears to the total quantity of the formula. Said means will now be described.

Figure 2:
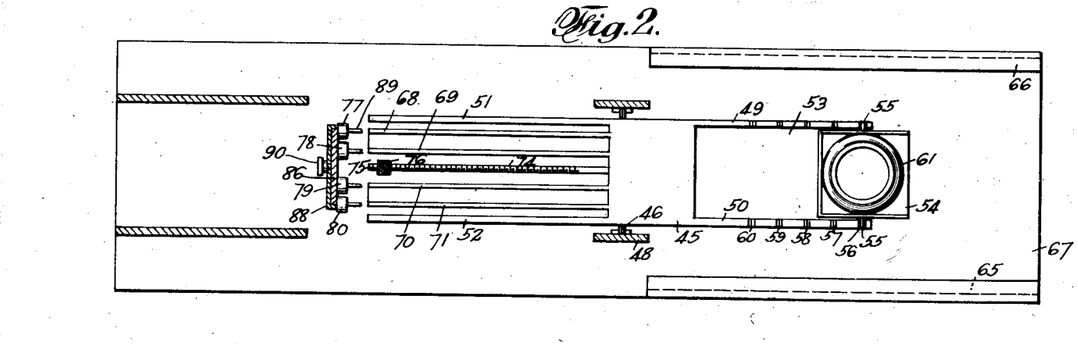
Fig. 2 is a horizontal section thereof.

The weighing lever or beam 45 (Figs. 1, 2 and 4) is pivoted on the knife edge 46 carried by a stationary block 47 secured to the frame 48 of the machine. The lever 45 is preferably of considerable width and is provided with a pair of spaced arms 49, 50 at its right end as viewed in Fig. 2, and with a similar pair of arms 51, 52 at its left end. In the space 53 between the arms 49 and 50, the box 54 having an open top and an open side may be arranged. Said box is provided with knife edges 55 adapted to enter any selected pair of the correspondingly shaped pairs of V-notches 56, 57, 58, 59 and 60 made in the upper edges of the arms 49 and 50. A suitable paint receptacle 61 to which the standard colors are supplied and in which they are mixed, is arranged in the box 54.

The respective notches 56-60 inclusive, may be marked with suitable indications to indicate the total amount of mixed paint desired, as shown in Fig. 1. For example, if a total of only one ounce of paint is required, the knife edges 55 are arranged in the pair of notches 56. If one and one quarter ounces of paint is required, said knife edges 55 are arranged in the notches 57, nearer the pivot 46 of the lever 45. In order, however, to permit the valve opening 40 to come over the receptacle 61, the frame 62 (Fig. 3), carrying the shaft 21 and the containers 20, is provided with flanges as 63, 64 inserted into the corresponding grooves 65, 66 of the frame base 67. Said frame 62 together with the containers and other mechanism carried thereby, may be moved horizontally as a unit, the flanges 63 and 64 sliding in the grooves 65 and 66. Said frame 62 may thereby be supported at the proper point in relation to the lever 45 to arrange the valve openings 40 of the containers above the receptacle 61.

Between the arms 51 and 52 of the lever 45, are arranged a pair of longitudinally extending members H-shaped in cross section (Fig. 4), thereby providing the upright bars 68, 69, 70 and 71. The bars 68 and 69 are connected by the web 72 of one of the H-shaped members, and the bars 70, 71 are connected by the web 73 of the other H-shaped members. Between the bars 69 and 70 is arranged the rod 74, which is threaded at its left end 75 and carries the correspondingly internally threaded adjusting weight 76.

It will be seen that after the receptacle 61 and the box 54 therefor have been arranged at the proper selected notches of the lever 45, the adjusting weight 76 can be rotated along the bar 74 to balance the lever to its zero indicating position, before the dispensing of any paint from the containers 20 is begun. It will further be seen that the bars 68, 69, 70 and 71 of the lever 45 are each adapted to slidably receive a weight, whereby the lever may be balanced after the dispensing of each of four or less selected standard colors. Since there are seldom more than four standard colors in a mixed paint, it will be seen that by means of four weights, it becomes possible, after each weight is arranged on its corresponding bar, to cause the lever to be balanced by dispensing precisely the required amount of paint from a selected container into the receptacle 61, and that when the total desired quantity is accumulated in the receptacle, the lever is also balanced. While the set of weights comprises four, it will be understood that any other number may be used instead to correspond with the number of lever bars. The weights used for this purpose are preferably C-shaped in cross section (Fig. 4), and may each be provided with a suitable slot into which the web 72, 73 enters and with an internal space into which one of the bars 68-71 may enter.

Preferably, three sets of such weights are provided, though it will be understood that any desired number may be used in connection with a corresponding number of rows of figures on the lever. One set as 77, 78, 79 and 80 is designed to be used in connection with the uppermost row 81 of figures at the right end of the lever, providing total quantity indications for the notches 56-60. A second similar set of weights designated by the numeral 82 is provided for use with the middle row 83 of numerals, and a third set of weights 84 is provided for use in connection with the third row 85 of numerals. All three sets of weights are suitably mounted on a slidable plate 86 sliding in the upright groove 87 of the frame member 88. Each of the weights is mounted when not in use on a horizontal support as 89 projecting from the plate 86. The plate 86 is movably held in its proper position to align the lower set of weights, or the upper sets 82 and 84 of weights with the bars 68-71, by means of the screw 90 passing through a suitable slot in the frame member 88 and into the plate 86.

When the screw 90 is loosened, the plate 86 may be moved upwardly or downwardly to bring the desired set of weights into horizontal alignment with the weight carrying bars, whereby the machine becomes adapted for dispensing a wide range of total quantities of paint from one ounce up as shown by the rows 81, 83 and 85 of numerals.

Figure 4:
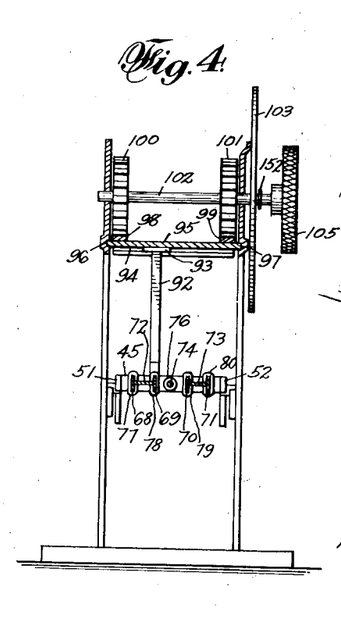
Fig. 4 is a vertical section thereof taken on the line 4—4 of Fig. 1.

Means are provided for determining the proper position of the weights on their respective bars and thereby to determine the quantity of the standard color to be dispensed from the selected container. Said means comprises tht weight stop 91 carried by the upright arm 92, the upper end of which is secured to the slide plate 93 (Figs. 1 and 4). Said plate 93 is inserted in a pair of transverse grooves 94 of the stop carrier 95, the edges of which are inserted into the longitudinal grooves 96, 97 of the machine frame. The carrier 95 carries a pair of spaced racks 98, 99 which engage the respective pinions 100, 101 on the shaft 102. An indicating dial 103 is also carried by the shaft 102 outside of the frame of the machine, and is also provided with a set of indicating numerals 104 designating the quantity of a standard paint color in a formula for a mixed paint. An operating knob as 105 is secured to the shaft 102. By means of said knob, the dial 103, the shaft 102 and the pinions 100, 101 may be rotated. Through the pinions, the racks 98, 99 are moved longitudinally, carrying with them the stop carrier 95, the plate 93, the arm 92 and the stop 91. Said stop may be thereby arranged at its proper point along the length of the lever 45 to determine the positions of the weights mounted on the lever bars 68-71. Since the plate 93 is movable transversely in the groove 94, the stop 91 may be interposed in the path of the weight to be mounted on any of the lever bars, and after one weight is so positioned and the paint dispensed into the receptacle 61 from a selected container, then the stop 91, may be moved transversely into the path of the next weight to be arranged on the next bar.

Figure 8:
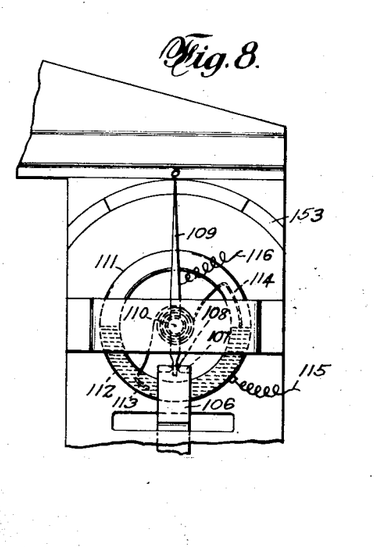
Fig. 8 is an enlarged front elevation of the switch and indicating means controlling the dispensing of small quantities of standard paint.
Figure 9:
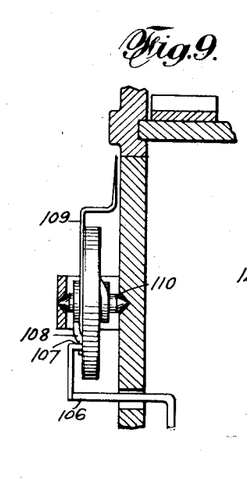
Fig. 9 is a vertical section of the same.

As has been previously indicated, means are provided for indicating the balanced position of the lever 45. Referring to Figs. 1, 8 and 9, I have there shown said means as comprising the arm 106, projecting upwardly from the lever 45 above the pivot point thereof, and provided with a slotted flange 107. Into the slot of said flange is arranged the lower end 108 of the indicating pointer 109. Said pointer is pivoted to the frame of the machine as by means of the pivot 110, and when the lever is balanced, is in its proper upright and zero indication position.

Said pointer controls a suitable switch for energizing the valve opening means which is adapted to open the valve of the selected container to dispense paint therefrom. The switch may take any suitable form, but as shown, comprises a circular mercury tube 111 half filled with mercury 112. A pair of contact members 113, 114 are arranged in the tube, one of said members 113 contacting the mercury at all times while the other member 114, being just out of contact with the mercury when the pointer 109 is in its zero position. When, however, the various weights have been arranged on the weight carrying bars of the lever 45, then the pointer 109, having been moved out of its original position to indicate that the lever is not balanced, and the tube 111 secured to said pointer having also been rotated to change the position of the mercury level, the contact member 114 also contacts with the mercury and closes the circuit to certain parts of the valve opening means. Said contact members are suitably connected as by the leads 115, 116 to the solenoid 117 comprising part of the valve opening means. It will be understood that when the lever has become unbalanced in the proper direction by the addition of weights thereto, the circuit to the solenoid 117 will be closed and the valve opening means is ready to be set into operation, as will be more fully described hereinafter.

Figure 10:
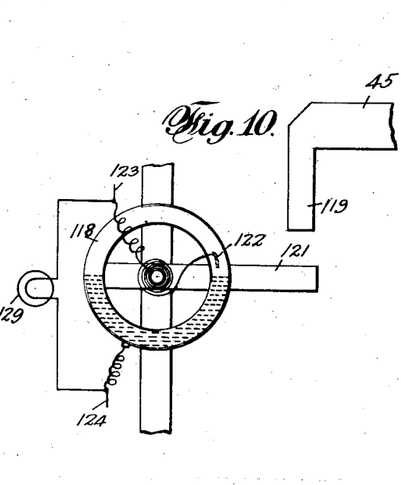
Fig. 10 is a front elevation of the auxiliary switch for controlling the flow of comparatively large total quantities of standard paint.

It will be further understood that the switch 111 is operative alone in connection with the mixing of comparatively small quantities of paint since the various weight for such small quantities do not cause any substantial displacement of the lever 45 from its balanced position. Where, however, larger quantities of paint, such as two ounces and over are to be dispensed, it becomes advisable to open the valve of the paint container to a substantial extent to permit the paint to flow therefrom with comparative rapidity. In such cases, the weights will cause substantial displacement of the lever 45 and will cause the additional operation of a second mercury switch 118 (Figs. 1 and 10), and thereby to cause the valve operating means to open the valve of the paint container to its greatest extent. As shown in said figures, the left end 119 of the lever 45 is adapted to rotate the switch 118 and to close said switch and thereby to energize the auxiliary solenoid 120. When the weights depress the lever end 119, said end engages the arm 121 on which the mercury switch is mounted, thereby rotating the mercury tube and carrying the liquid mercury into contact with the contact member 122 and closing the circuit. Suitable leads 123 and 124 lead from the terminals of the switch to the solenoid 120. To apprise the user that paint is being dispensed from the paint container, a light as 129 may be interposed between the leads 123 and 124 or between the leads 115 and 116. The light lights up only when paint is being dispensed and serves as a caution signal.

The valve operating means including the solenoids 117 and 120 will now be described. The solenoid 117 is provided with a shaft 125 slidably mounted in the solenoid frame 126 for vertical reciprocation therein, said shaft terminating in an enlarged head 127. Interposed between the solenoid 117 and the frame 126, is the spring 128 urging the solenoid 117 towards its uppermost position in the frame. As shown in Fig. 3, a hand lever 130 is mounted on the shaft 131, which is carried by the bracket 132 secured to the standard or frame 62. Said lever 130 is provided with a preferably soft iron member 133 so that when the lever 130 is manually pulled down, the member 133 engages the solenoid 117 and if said solenoid is energized, is held down thereby. Such movement of the lever 130 causes rotation of the shaft 131. Said shaft is provided with a crank arm 134 arranged in position to engage the valve pin 33 and to raise said pin a predetermined amount when the solenoid 117 only is energized. The valve plunger 38 is thereby slightly raised. Such slight opening of the valve permits paint to drip slowly from the container 20 into the receptacle 61.

If a small amount of paint is to be discharged from said container, it will be understood that the weights on the lever 45 are inoperative to cause the lever end 119 to contact with the arm 121 and to rotate said arm. If, however, a comparatively large amount of paint is to be dispensed, the weights displace the lever 45 a sufficient amount, as has been hereinbefore indicated, to rotate the switch 118 into its circuit closing position. In such position, the solenoid 120, similar to the solenoid 117, is energized. Said solenoid 120 thereby attracts the solenoid 117 through the armature 127 thereof and further lowers the lever 130, thereby causing the crank arm 134 to still further lift the pin 33 and the valve plunger 38 and thereby to open the valve to a greater extent. The flow of paint into the receptacle 61 is consequently accelerated when comparatively large amounts of paint are to be withdrawn from the container 20. The solenoid support 126 is adjustable to control the amount of initial movement of the lever 130 when it is first brought into contact with the armature of the solenoid 117. Toward this end, the adjusting screw 135 passes through a suitable threaded opening in the stationary frame support 136 which slidably supports the frame 126. The inner end of the screw 135 abuts against the lower end of the frame 126. Interposed between the frame 126 and the support 136, is the tension spring 137 tending to draw the frame 126 downwardly and against the inner end of the screw 135. By adjusting the screw 135, the vertical position of the frame 126, and consequently the gap between the armature of the solenoid 117 and the lever 130, is adjusted, thereby regulating the amount of initial opening of the container valve.

Figure 5:
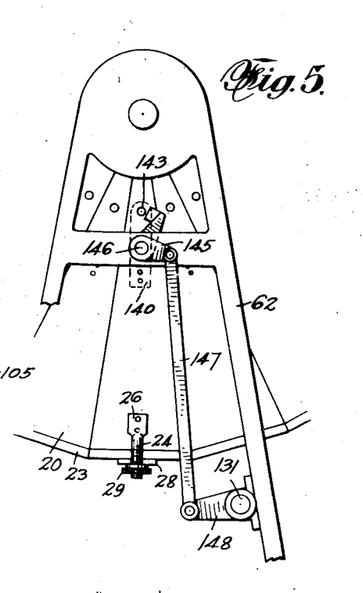
Fig. 5 is a fragmentary end elevation of the left side of the container support as viewed in Fig. 1.
Figure 6:
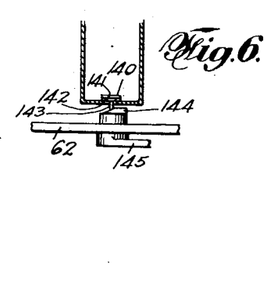
Fig. 6 is a top plan view, partly in section, of the air inlet valve for a container for paint of a standard color.

Means are provided for venting the containers 20 when paint is discharged therefrom (Figs. 5 and 6). Said means comprises the elongated flat spring 140 secured at one end to an inner face of the side wall of each of the containers 20. The other end of the flat spring carries a suitable tapered valve 141, which is adapted to seat against the tapered seat 142 of a venting valve opening in the container side. The valve 141 carries a pin 143 projecting outwardly therefrom and engaging the inclined cam surface 144 of a bell crank lever 145. Said bell crank lever is pivoted to the frame of the machine as at 146 and is operated by the link 147 connected at one of its ends to said crank bell lever, and at the other of its ends to the crank 148 secured to the shaft 131. It will be seen that on the manual depression of the lever 130 and the consequent rotation of the shaft 131, the cam surface 144 moves the pin 143 and the valve from which it extends, inwardly, and permits air to enter the container through the valve opening 142.

After the selected container 20 has been brought into its lowermost position by means of the handle 22 to dispense paint therefrom, said container is held in said position by a suitable detent, comprising the ball 149 (Fig. 1), spring pressed into engagement with a suitable notch or depression in the side wall of the container, as by means of the spring 150.

In order to prevent energization of either of the solenoids 117 or 120 accidentally, a forked switch operating arm as 151 operatively connected to the main switch 155, is arranged with the branches thereof on opposite sides of the lever 130. When said lever is moved downwardly into contact with the armature of the solenoid 117, the main switch 155 to the solenoids is closed, and when said lever is in its uppermost position as shown by the dotted lines of Fig. 3, the switch 155 is open and the circuit to the solenoids is opened.

The operation of my new machine is as follows:

It being assumed that the required formula calls for fluid measure in terms of fluid ounces of a number of standard colors sufficient to make up any quantity such as a quart of a mixed color, it must be remembered that the present machine does not directly control the volume of the paint but primarily controls the weight of the paint in accordance with the setting of the pointer 152 (Fig. 1) on the dial 103, and through the weight, controls the volume.

Since, however, standard paints of different colors may not weigh precisely the same, but differ somewhat, it becomes advisable in advance of the insertion of the standard paints into their containers, to regulate the weight of the paint so that when the paint is dispensed by weight, the proper quantity as determined by the fluid ounces called for by the formula, is dispensed from the selected container. To so regulate the weight of the standard paint colors, the weight of the heaviest paint is taken as standard. Assuming for the purposes of computation that the weight of a quart of the heaviest paint is six pounds, and the weight of a quart of the lightest paint is four pounds, then two pounds of thinner is added to a quart of the lightest paint to bring the weight of said lightest paint up to the weight of a quart of the heaviest paint, namely, six pounds. This is done before the paint is poured into its proper container 20. Similarly, if another standard color weighs four and one-half pounds to the quart, then one and a half pounds of thinner would be added to a quart of such standard color to bring its weight up to six pounds.

After the lighter paints have been properly thinned in accordance with the above rule, they are then inserted into the selected container 20, the plate 23 being removed for this purpose, and then refastened in place. Each of the containers bears a number as 19 which by reference to a table will give the exact standard color in the container. For example, the container marked "1" in Fig. 3 may contain standard white, the container marked "2" may contain black, the container marked "3" dark blue (Chinese), the container marked "4" Prussian Blue, etc. Before setting the machine to dispense any standard color, the handle 22 is given a number of turns to adequately stir up the paint in all of the containers.

Let us assume that one ounce of a certain blue (Limousine Blue No. 3) paint is required according to the following formula:

| | Fluid ounces |
|---|---|
| Dark blue | 23⅜ |
| White | 6 |
| Black | ⅝ |
| Prussian blue | 2 |
| Total | 32 |

After stirring the paint, the receptacle 61 is arranged in its box 54 and the knife edges 55 of said box are set in the notches 56 at the designation 1, meaning one ounce. The insertion of the receptacle in the box will cause the left end of the lever 45 to rise and to swing the pointer 109 in a clockwise direction. The lever should therefore be balanced before the dispensing of the paint is commenced. This is done by rotating the weight 76 so that it moves along the rod 74 in the proper direction to bring the pointer 109 very slightly to the left of or at the zero mark on the scale 153. In this position, the lever 45 is balanced, but the contact member 114 of the switch associated with the pointer 109 has not entered the mercury 112 and does not close the circuit to the solenoid 117, and the lamp 129 is not lighted.

The next step in the operation of the machine is to provide for the dispensing of the required amount of dark blue which is given in the formula as 23⅜ ounces. This is done by sliding one of the weights as 77 off its support on the plate 86, it being understood that the lowermost set of weights have first been brought into alignment with the respective bars 68–71 by the proper manipulation of the plate 86. Said weight 77 is moved along the bar 68 until it engages the stop 91, which stop has been moved transversely of the groove 94 to interpose it in its proper position along the bars 68. The stop 91 is also set by rotating the knob 105 until the pointer 152 is set on the scale 104 to read 23⅜. The stop thereby becomes arranged in the proper position so that when the weight 77 is brought into contact therewith, said weight is in its required position to dispense that part of one ounce, which 23⅜ bears to 32 (32 being the total quantity of the formula). The weight 77 unbalances the lever and causes the left end thereof to drop slightly, whereby the pointer 109, due to the movement of the lower end thereof toward the left, as viewed in Fig. 8, advances towards the right of the zero of the scale 153. At the same time, the mercury tube 111, rotating with the pointer 109, causes the contact member 114 to enter the mercury and to close the circuit to the solenoid 117. Said circuit, however, is not yet energized because the main switch 155 is still open.

The handle 22 having been rotated to bring the container of the standard dark blue paint (marked 3) lowermost into dispensing position, the lever 130 is lowered manually to bring the member 133 thereon into contact with the armature of the solenoid 117. Such movement of the lever 130 closes the switch 155 and energizes the solenoid 117, whereby said solenoid holds the lever 130 down. On the movement of said lever, the shaft 131 is rotated, thereby causing the crank arm 134 to raise the pin 33 and to swing the lever 34 about its pivot, whereby the valve plunger 38 is slightly raised and the discharge of paint through the valve opening 40 begins. The lamp in the circuit of the leads 115 and 116 is also lighted simultaneously. It will be understood that the weight 77 is insufficient to lower the left end of the lever 45 to a sufficient extent to close the switch 118. Under these circumstances, the solenoid 120 is inoperative and the discharge of liquid from the container is comparatively slow, as it should be to accurately dispense the very small quantity of blue paint (approximately ⅜⅜ of an ounce). As the paint drips into the receptacle 61, the lever tends to assume its balanced position and finally does assume such position when the proper amount of paint has been dispensed into the receptacle. In such balanced position, the pointer 109 is at zero, the contact member 114 is out of the mercury, and the circuit to the solenoid 117 is open. Said solenoid therefore releases the member 133, the spring 42 becoming effective to lower the right end of the lever 34 and the valve plunger 38 to close the valve, the lever 130 moving back under the influence of said spring through the operation of the pin 33 toward its dotted line initial position (Fig. 1). The parts having assumed their initial positions, the operation may now be repeated with the next color, namely, white, of which six (6) ounces are required in the formula.

The pointer 152 is now set on the scale 104 to read 6. The next weight 78 is now moved on to the bar 69 and against the stop 91 which has been positioned at the proper point when the pointer 152 has been set, as above described. The lever 130 is then moved to close the switch 155 and to bring the member 133 thereon into engagement with the solenoid 117, whereby the paint valve of the white container, which has previously been set into its proper position by the rotation of the handle 22, is opened. These operations are repeated by the setting of the pointer 152 to ⅝ on the dial 103 to dispense the proper amount of black, the weight 79 being arranged on the bar 70 for this purpose, and again repeated in connection with Prussian blue by the setting of the pointer at 2 on the scale and the use of the weight 80 by sliding said weight on the bar 71 and against the stop 91. In this manner, the correct proportions of each standard color are dispensed to make a total of one ounce of the mixed paint.

The same operations are used in connection with the dispensing of totals greater than one ounce and less than two ounces by use of a different one of the notches 57–60 inclusive. That is to say, that if one and one-quarter ounces is to be dispensed, the receptacle 61 and the box 54 therefore are moved to the left as viewed in Fig. 1 to carry the knife edges 55 into the notches 57. The frame 62 is correspondingly moved to the left by sliding the flanges 63, 64 thereof in the grooves 65, 66 until the valve openings of the containers 20 are arranged in vertical alignment with the receptacle. The method of setting the pointer 152 and consequently moving the stop 91 and then arranging the weights 77–80 on the respective bars 68-81 and the movement of the lever 130 between settings and the selection of the paint containers, remains the same, but the dial settings are in accordance with the desired formula.

Should it be desired to dispense a total quantity of from three to six ounces of paint, the corresponding notches, as shown by the row 83 of figures (Fig. 11) is used for the box receptacle 54. Correspondingly, the plate 86 is moved to carry the set 82 of weights into horizontal alignment with the bars 68-71. Similarly, to dispense total quantities of eight to sixteen ounces, the third row 85 of figures on the lever 45 and the corresponding notches therein are used to arrange the receptacle 61 in its proper place on the lever. In that case, the third row 84 of weights is used by the proper manipulation of the plate 86. When such comparatively large total quantities are to be dispensed, the weights on the lever 45 may be sufficient to cause the left end 119 thereof to contact with the switch arm 121 and to cause the switch 118 to close the circuit to the solenoid 120. Such closing of the circuit energizes said solenoid and causes it to lower the solenoid 117 together with the lever 130 held thereby and thereby to open the valve 40 to a greater extent and to permit the paint to flow more freely from the container. It will be understood that the notches 57-60 and the weights may be such that the machine is adapted to mix other total quantities of mixed paints and that the rows of figures 81, 83 and 85 may be changed accordingly.

Figures 12, 13:
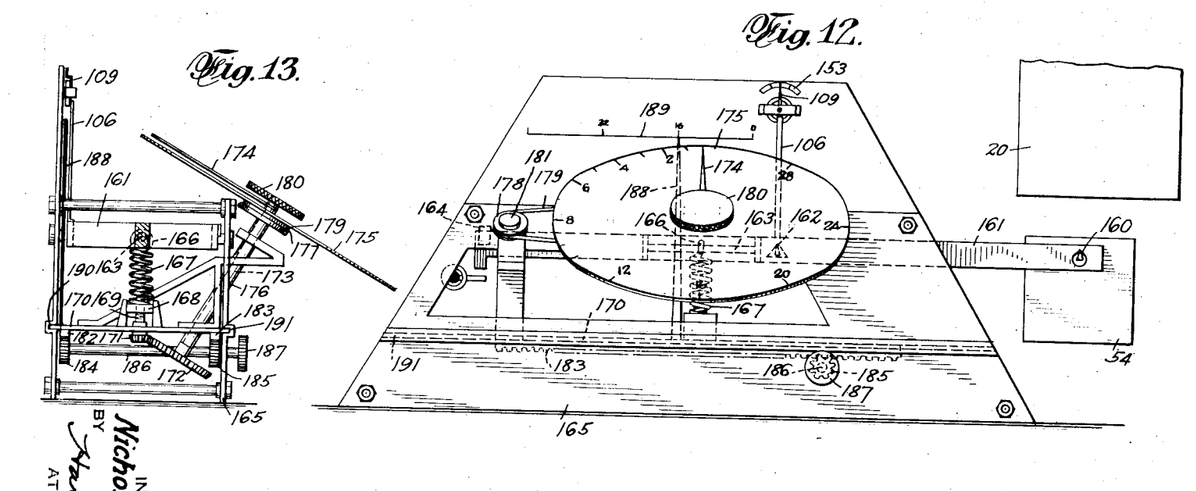
Fig. 12 is a front elevation of a modified form of my invention, wherein a spring is substituted for sliding weights.
Fig. 13 is an end elevation of the same.

Referring now to Figs. 12 and 13, I have there shown a machine in which the various weights 77-80, 82 and 83 are dispensed with and a suitable spring substituted therefor. The frame 62 and the containers 20 carried thereby as well as the container valve operating means, being identical with the structure shown in Fig. 1, need not be repeated in connection with the machine of Figs. 12 and 13. However, said frame need not be slidably mounted since the position of the receptacle holding box 54 on the lever 161 is not changed, said box being pivoted on the knife edges 160 of said lever. The means for controlling total quantities to be dispensed comprises means for shifting the point at which the spring pulls on the machine lever.

The lever 161 is pivoted on the knife edges 162 secured to the frame 165 of the machine and instead of being provided with the weight carrying bars 68-71, is instead provided with a spring holding rod 163. A movable adjusting weight 164 serves to balance the receptacle box 54 and the receptacle held thereby, and to arrange the pointer 109 at the zero point of the scale 153 ready for the closing of the circuit by the switch 111 in the manner hereinbefore described. It will be understood that when the lever 161 is so balanced, the hooked upper end 166 of the spring 167 is slightly above the rod 163 and out of contact therewith.

The lower end of said spring is secured to the vertically slidable block 168, which block is adjustable by means of the screw shaft 169 passing through the block and having a bearing in the plate 170. Said shaft 169 carries at its lower end the bevel pinion 171 which engages the bevel gear 172 on the shaft 173. At the upper end of said shaft, is carried the adjusting knob 180 and the pointer 174. On the sleeve 176 mounted on said shaft is the dial 175 secured to the pulley 177 which is connected to the pulley 178 by means of the belt 179. It will be seen that on rotation of the operating knob 181 for the pulley 178, the belt 179 and the pulley 177 are moved so that the zero point of the dial 175 may be brought underneath the pointer 175. It will also be seen that on rotation of the knob 180, the inner shaft 173 is rotated, thereby raising or lowering the spring block 168 and tensioning or releasing the spring 167.

On the underside of the plate 170 are secured the pair of racks 182, 183 engaging the pinions 184, 185 on the shaft 186 mounted in the frame 165. At the outer end of said shaft is the operating knob 187. Rotation of the knob 187 causes longitudinal movement of the plate 170 and thereby carries the parts mounted thereon, including the spring 167, the dial 175 and the parts connected thereto, longitudinally of the lever 161. Said knob 187 is therefore used to set the pointer 188 carried by said plate 170 to the proper point along the scale 189 on the frame 165 to indicate the total quantity of paint to be mixed.

In operation, the weight 164 is first used, as has been hereinbefore indicated, to balance the receptacle box 54 and the paint receptacle carried thereby. This carries the pointer 109 to the zero position wherein the switch 111 is about to be closed. The pointer 174 having been rotated by the knob 180 to its upright position, the block 168 has thereby been raised owing to rotation of the shaft 172 and the consequent rotation of the screw shaft 169, to relieve all stress upon the lower end of the spring 167, and thereby to raise the upper end 166 of said spring slightly above the bar or rod 163. It will be understood that the upper spring end 166 has thus been disengaged from the lever and from the bar 163 therefore before the lever has been balanced by the weight 164. The proper container 20 having been brought into its dispensing position, the knob 187 is operated to carry the pointer 188 to the proper mark on the scale 189 to indicate the total amount of paint required. Such operation of the knob slides the plate 170 longitudinally of the frame 165 in the grooves 190 and 191 and also carries the spring 167 along the rod 163. When the total quantity of mixed paint desired has thus been indicated and the dial 175 has been rotated through the knob 181 to carry the zero point thereof under the upright pointer 174, said pointer may now be rotated through the knob 180 to indicate the amount of paint of the first standard color in the formula. As the knob 180 is rotated, the shaft 173 is also rotated, pulling down the block 168 and tensioning the spring 167, the upper end 166 of said spring being pulled down on the bar 166 and exerting its force upon the lever 161 to depress the left end of said lever. If said lever is depressed to a comparatively slight extent, only the solenoid 120 is operated to cause paint to drip slowly from the paint container 20. If, however, a comparatively large amount of paint is to be dispensed, the left end of the lever 161 is depressed to a comparatively large extent, thereby closing the switch 118. Thereafter, on the manual operation of the lever 130, the valve of the paint container is opened and the paint is discharged therefrom into the receptacle until the lever 161 again becomes balanced. The pointer 174 may be left in the indicating position thereof for the first standard color and the dial 175 is now rotated by the knob 181 to bring the zero point thereof underneath said pointer. Said pointer is now again moved by the knob 180 to indicate the amount of the next standard color in the formula and the operation is repeated until all the standard colors in the proper quantities have been discharged into the receptacle.

It will be seen that I have provided a simple machine adapted to be operated with accuracy and efficiency, and without any calculations, to dispense and mix the proper amounts of paints of standard colors to make up accurately a desired total quantity which may be small or large, and the flow of paint is automatically cut off from the paint container when the desired quantity has been dispensed.

It will also be seen that while I have described my machine in connection with the mixing of paint, it is also well adapted for the compounding of pharmaceutical and other products made up in accordance with formulae, and I therefore intend that the word "paint" mentioned herein refer also to any material which can be dispensed by the machine.

While I have shown and described certain specific embodiments of my invention, I do not wish to be understood as limiting myself thereto, but desire to claim my invention as broadly as may be permitted by the state of the prior art and the scope of the appended claims.

I claim:

1. In a machine for dispensing in succession paints of standard colors to make up a total quantity of mixed paint in accordance with a formula giving a different total quantity of such mixed paint, a weighing lever, means for indicating a total amount of paint required by indicating the position of a force applied to one end of the lever, a dial, a movable pointer for the dial, manually operated means for controlling the setting of the pointer on the dial and for controlling the unbalancing force put upon the lever, and means controlled by the lever for controlling the discharge of paint from a paint container.

2. In a machine of the character described, a weighing lever, manually settable means including a dial and a pointer therefor for indicating the weighting of one end of said lever, a receptacle at the other end of the lever, means for indicating the total amount of material required by indicating the position of said receptacle, and means for controlling the discharge of material into the receptacle when the lever is weighted and unbalanced and for cutting off the discharge when the lever is balanced by the discharged material.

3. In a machine of the character described, a weighing lever, a first manually presettable means for indicating a total amount of paint required, by indicating the position of a force applied to one end of the lever, a second manually presettable means for indicating the quantity of a standard paint required in accordance with a formula for a mixed paint comprising a number of standard colors, means controlled by the last mentioned indicating means for applying an unbalancing force to said lever, and paint discharge means controlled by the position of said lever and operated until the lever is balanced.

4. In a machine of the character described, a pivoted weighing lever having a plurality of weight carrying bars thereon, a weight for each of the bars, stop means adapted to be interposed along any of the bars to determine the positions of said weights on said bars, indicating gear means for controlling the position of the stop means, a receptacle carried by the lever, and means controlled by the lever for dispensing material into said receptacle until the lever is balanced.

5. In a machine of the character described, a lever, a series of weights adapted to be arranged on said lever, indicating stop means for indexing the positions for said weights, said stop means including a relatively movable pointer and dial and gear means for operating the same, and means for balancing said lever and said weights comprising a material receptacle carried by the lever and material discharge means controlled by the lever, and operative only when the lever is unbalanced for discharging material into said receptacle.

6. In a machine of the character described, a series of valved containers, means for movably supporting said containers whereby a selected one of said containers may be moved into position for the dispensing of material therefrom, a lever, a receptacle carried on one side of said lever in position to receive material discharged from a selected receptacle, indicating means for indicating the position of the receptacle on the lever and thereby controlling the movement of the lever, means for weighting the other side of the lever, and means operative on the unbalancing of said lever by said weighting means for discharging material into said receptacle from the selected container, and means for controlling said material discharging means including indicating means adapted to be set manually for indicating the quantity of paint of a standard color in a formula.

7. In a machine of the character described, a lever having a plurality of weight receiving bars thereon, a set of weights one for each of the bars, additional similar sets of weights of different mass, means for aligning each of said sets of weights with said bars, stop means for controlling the positions of said weights on said bars, gearing for operating said stop means, a pointer operated by said gearing simultaneously with said stop means, means on said lever for receiving sufficient material to balance said weights, and means for discharging material into said material receiving means only when said lever remains unbalanced.

8. In a machine of the character described, a lever, a spring adapted to exert an unbalancing pull on said lever, indicating means for controlling the position of said spring relatively to said lever, and additional indicating means for controlling the pull exerted by said spring on said lever.

9. In a machine of the character described, a lever, a spring adapted to exert an unbalancing pull on said lever, indicating means for controlling the position of said spring relatively to said lever, additional indicating means for controlling the pull exerted by said spring on said lever, a receptacle carried by said lever, and means controlled by the lever for discharging sufficient material into said receptacle to balance the lever.

10. In a machine of the character described, a spring, indicating means including a dial and a pointer, means for rotating said dial with reference to said pointer, means for rotating the pointer with reference to the dial to exert tension on said spring, a lever operatively connectable to said spring by the spring tensioning means, and means for supporting said dial, said pointer, said spring and said tensioning means for bodily movement as a unit relatively to said lever.

11. In a machine of the character described, a lever, a pivot for the lever, a spring comprising the sole means for exerting an unbalancing pull on the lever, said spring being arranged with its axis at substantially right angles to the lever and on one side of the pivot, means for moving one end of the spring to engage the other end of the spring with the lever, and to tension said spring, means to indicate the tension on the spring and the weight needed at that end of the lever on the other side of the pivot to balance the lever, means for moving said spring bodily relatively to the pivot, and means to indicate the change in weight necessary to balance the lever in the position into which the spring is moved bodily.

12. In a machine of the character described, a pivoted lever, a spring on one side of the pivot for the lever, means for tensioning and releasing said spring including indicating means for indicating the stress applied to the lever by the spring, and an indicating dial, means for moving the spring longitudinally of the lever, a receptacle removably carried by the lever and adapted to receive material to balance the force exerted on the lever by the spring, and means controlled by the lever for discharging material into said receptacle until the lever is balanced.

13. In a machine for dispensing in succession paints of different standard colors to make up a total quantity of mixed paint in accordance with a formula giving a different total quantity of such mixed paint, a weighing beam, means for indicating a counter balance on the weight beam corresponding to the individual quantity of standard color paint in said different total quantity as given by said formula, said means including a rotatable dial and a rotatable pointer, and means for setting said pointer relatively to said dial to indicate said individual quantity and for also controlling the amount of the paint of standard color dispensed by the machine, said amount being different from the indicated individual quantity, said dial being movable to carry the zero point thereof to the pointer after each setting of the pointer and after the paint of one standard color has been dispensed and preparatory to dispensing paint of the next standard color, said dial remaining in the position into which it is moved during the dispensing operation.

14. In a machine for dispensing in succession paints of standard colors to make up a total quantity of mixed paint in accordance with a formula for a different total quantity of such mixed paint, a series of containers for standard color paints, means for movably supporting said containers whereby a selected container may be moved into the paint dispensing position thereof, a valve for each container, a weighing lever, means for weighting said lever in accordance with the individual quantity of standard color paint in said different total quantity as given by said formula, manually settable means operatively connected to the weighting means for indicating said individual quantity, means for indicating said first-mentioned total quantity and for also indicating the correct position of a weighting force on the lever to control the delivery of a quantity other than said first-mentioned total quantity from the selected container, and means controlled by the lever for opening the valve of a selected container to discharge therefrom the required amount of standard color paint in said first-mentioned total quantity of mixed paint and to automatically close said valve when the required amount has been discharged, said required amount being the product of said total quantity indicated by the second-mentioned indicating means and the fraction whose numerator is the individual quantity of standard color paint indicated by the first-mentioned indicating means and whose denominator is the said different total quantity in the formula.

15. In a machine of the character described, a series of paint containers, means for rotating said series to carry a selected one of said containers into paint-dispensing position and also to agitate the paint therein, valve means on each of said containers, manually presettable means for indicating the amount of paint to be dispensed from a selected container in terms of the amount of said paint in a formula in which other paints are also ingredients, means for indicating the total amount of paint including said other paints to be dispensed from all of the selected containers to make up the desired total amount of mixed paint, means for opening the valve means of the selected container until the required amount of paint has been dispensed therefrom and then to release and close the valve means, and means responsive to the setting of said presettable means and of said indicating means for controlling the operation of the valve opening and closing means.

16. In a machine for dispensing in succession paints of standard colors to make up a total quantity of mixed paint in accordance with a formula for a different total quantity of such mixed paint, a series of containers for paints of standard colors, revoluble means for moving said containers whereby a selected container may be moved into the paint-dispensing position thereof and the paint therein agitated and conditioned for being dispensed, a valve on each of the containers, means for opening and closing the valve of a selected container, and means including two presettable indicating means for controlling the operation of the valve opening and closing means, one of said indicating means indicating the total quantity of mixed paint desired and the other indicating the amount of a standard color paint in the formula.

17. In a machine for dispensing in succession paints of standard colors to make a total quantity of mixed paint in accordance with the formula for a different total quantity of such mixed paint, a series of containers each for a paint of a standard color, means for revolubly supporting said containers for the rotation of a selected container into the paint-dispensing position thereof and for the agitation of the paint therein, a valve on each container, means for operating the valve of a selected container and means for controlling the valve operating means, said controlling means including indicating means adapted to be set in advance of the delivery of paint by the machine into position for indicating the quantity of paint of a standard color in the formula, said quantity being different from the quantity of said standard color paint dispensed by the machine, said controlling means also including additional indicating means for indicating the total quantity of mixed paint desired.

NICHOLAS GRUBELIC.